US010452961B2

(12) United States Patent
Hu et al.

(10) Patent No.: US 10,452,961 B2
(45) Date of Patent: Oct. 22, 2019

(54) LEARNING TEMPORAL PATTERNS FROM ELECTRONIC HEALTH RECORDS

(71) Applicant: International Business Machines Corporation, Armonk, NY (US)

(72) Inventors: Jianying Hu, Bronx, NY (US); Yajuan Wang, White Plains, NY (US); Fei Wang, Ossining, NY (US); Chuanren Liu, Upper Darby, PA (US)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 14/921,365

(22) Filed: Oct. 23, 2015

(65) Prior Publication Data

US 2017/0046602 A1   Feb. 16, 2017

Related U.S. Application Data

(60) Provisional application No. 62/205,160, filed on Aug. 14, 2015.

(51) Int. Cl.
*G06K 9/62* (2006.01)
*G06T 11/20* (2006.01)

(52) U.S. Cl.
CPC .......... *G06K 9/6296* (2013.01); *G06T 11/206* (2013.01); *G06K 2209/05* (2013.01)

(58) Field of Classification Search
CPC . G06K 9/6269; G06K 2209/05; G06T 11/206
USPC .......................................................... 706/45
See application file for complete search history.

(56) References Cited

U.S. PATENT DOCUMENTS

| 8,583,586 | B2 | 11/2013 | Ebadollahi et al. |
| 8,799,286 | B2 | 8/2014 | Cooper et al. |
| 2009/0150289 | A1 | 6/2009 | Joe et al. |
| 2010/0106522 | A1* | 4/2010 | Cooper ................ G06F 19/321 705/3 |
| 2012/0084092 | A1 | 4/2012 | Kozuch et al. |
| 2013/0191160 | A1 | 7/2013 | Oran |
| 2013/0275448 | A1 | 10/2013 | Mirhaji |
| 2013/0332194 | A1 | 12/2013 | D'Auria et al. |
| 2014/0257045 | A1 | 9/2014 | Hu et al. |
| 2014/0358581 | A1* | 12/2014 | Sudharsan ............ G06N 7/005 705/2 |
| 2014/0358926 | A1* | 12/2014 | McGregor ............ G16H 10/60 707/737 |
| 2015/0025908 | A1 | 1/2015 | Lakshminarayan et al. |

(Continued)

OTHER PUBLICATIONS

Lakshmanan et al., "Investigating Clinical Care Pathways Correlated with Outcomes". (Year: 2013).*

(Continued)

*Primary Examiner* — Dave Misir
(74) *Attorney, Agent, or Firm* — Kristofer L. Haggerty, Esq.

(57) ABSTRACT

In one embodiment, a computer-implemented method includes transforming a plurality of electronic health records into a plurality of temporal graphs indicating an order in which events observed in the plurality of electronic health records occur and learning a temporal pattern from the plurality of temporal graphs, wherein the temporal pattern indicates an order of events that is observed to occur repeatedly across the plurality of temporal graphs.

12 Claims, 4 Drawing Sheets

(56) References Cited

U.S. PATENT DOCUMENTS

| | | | |
|---|---|---|---|
| 2015/0106115 A1 | 4/2015 | Hu et al. | |
| 2015/0356759 A1* | 12/2015 | Delling | G06T 11/206 345/440 |
| 2016/0210552 A1* | 7/2016 | Kasabov | G06N 3/08 |
| 2017/0032243 A1* | 2/2017 | Corrado | G06N 3/04 |

OTHER PUBLICATIONS

Liu et al., "Temporal Phenotyping from Longitudinal Electronic Health Records: A Graph Based Framework", KDD '15, Aug. 10-13, 2015, Sydney, NSW, Australia. (Year: 2015).*

Lin et al., "Mining time dependency patterns in clinical pathways". (Year: 2001).*

Gotz et al., "DecisionFlow: Visual Analytics for High-Dimensional Temporal Event Sequence Data", Date of publication Aug. 11, 2014. (Year: 2014).*

Meamarzadeh et al., "Extracting Temporal Rules from Medical data". (Year: 2009).*

Chuanren Liu et al., "Temporal Phenotyping from Longitudinal Electronic Health Records: A Graph Based Framework", KDD '15 Proceedings for the 21th ACM SIGKDD International Conference of Knowledge Discovery and Data Mining, pp. 705-714 (2015).

Park et al., "V-Model: a new perspective for EHR based phenotyping", BMC Medical Informatics and Decision Making, vol. 14, pp. 90; 2014; Publisher: BioMed Central Ltd.; Country of Publication: UK; ISSN:1472-6947; Database: INSPEC.

Peissig et al., "Relational machine learning for electronic health record-driven phenotyping", Journal of Biomedical Informatics, vol. 52, pp. 260-270; 2014; Publisher: Academic Press Inc Elsevier Science; Country of Publication: USA; ISSN:1532-0464; Database: SciSearch.

Wang, Fei, Noah Lee, Jianying Hu, Jimeng Sun, and Shahram Ebadollahi. "Towards heterogeneous temporal clinical event pattern discovery: a convolutional approach." In Proceedings of the 18th ACM SIGKDD international conference on Knowledge discovery and data mining, pp. 453-461. ACM, 2012.

Ayres, Jay, Jason Flannick, Johannes Gehrke, and Tomi Yiu. "Sequential pattern mining using a bitmap representation." In Proceedings of the eighth ACM SIGKDD international conference on Knowledge discovery and data mining, pp. 429-435. ACM, 2002.

Lakshmanan, Geetika T., Szabolcs Rozsnyai, and Fei Wang. "Investigating clinical care pathways correlated with outcomes." In Business process management, pp. 323-338. Springer Berlin Heidelberg, 2013.

"Data-Driven Healthcare", MIT Technology Review Business Report, 117(5):1-19, 2014.

Shiyu Chang, Charu C Aggarwal, and Thomas Huang, "Learning Local Semantic Distances with Limited Supervision", Data Mining, ICDM IEEE International Conference, Dec. 2014.

David Gotz, Fei Wang, and Adam Peter, "A methodology for interactive mining and visual analysis of clinical event patterns using electronic health record data", Journal of Biomedical Informatics, 48, 2014, 148-159.

Joyce C Ho, Joydeep Ghosh, Steve R.Steinhuql, Walter F Stewart, Joshua C Denny, Bradley A Malin and Jimeng Sun, "Limestone: High-throughput candidate phenotype generation via tensor factorization", Journal of Biomedical Informatics; 52: 199-211, Dec. 2014.

Joyce C Ho, Joydeep Ghosh, and Jimeng Sun, "Marble: High-throughput phenotyping from electronic health records via sparse nonnegative tensor factorization", In KDD Proceeding of the 20th ACM SIGKDD International Conference on Knowledge Discovery and Data Mining, Aug. 2014, 115-124.

George Hripcsak and David J Albers, "Next-generation phenotyping of electronic health records", Journal of the American Medical Informatics Association, 20(1): 117-121, Jan.-Feb. 2013.

David Kale, Zhengping Che, and Yan Liu, "Computational discovery of physiomes in critically ill children using deep learning", In Workshop DMMI in A MIA, 2014.

Eamonn Keogh, Kaushik Chakrabarti, Sharad Mehrotra, and Michael Pazzani, "Locally adaptive dimensionality reduction for indexing large time series databases", ACM SIGMOD, 2001.

Eamonn Keogh, Kaushi<: Chakrabarti, Michael Pazzani, and Sharad Mehrotra, Dimensionality reduction for fast similarity search in large time series databases, Knowledge and information Systems, vol. 3(Issue 3), Aug. 2001, 263-286.

Eamonn Keogh, Selina Chu, David Hart, and Michael Pazzani, An online algorithm for segmenting time series, In ICDM 2001 Proceeding of the 2001 IEEE International Conference on Data Mining, 289-296.

Thomas A Lasko, Joshua C Denny, and Mia A Levy, "Computational phenotype discovery using unsupervised feature learning over noisy, sparse, and irregular clinical data", PloS One, 8(8) Aug. 2013.

Chih-Jen Lin, "Projected gradient methods for nonnegative matrix factorization", Neural Computation, 19 (10): 2756-2779, 2007.

Jessica Lin, Eamonn Keogh, Stefano Lonardi, and Bill Chiu, "A symbolic representation of time series, with implications for streaming algorithms", SIGMOD workshop on Research Issues in DMKD, Jun. 2003.

Chuanren Liu, Kai Zhang, Hui Xiong, Geoff Jiang, a:od Qiang Yang. "Tempora Skeletonization on Sequential Data: Patterns, categorization, and Visualization", In KDD, Aug. 2014.

Laura B. Madsen, Data-Driven Healthcare: How Analytics and BI are Transforming the Industry, Wiley, 2014.

Fabian Morchen and Dmitriy Fradkin, "Robust Mining of Time Intervals with, Semi-interval Partial Order Patterns", SDM, Apr. 2010, 315-326.

Fabian Morchen and Alfred Ultsch, "Efficient mining of understandable patterns from multivariate interval time series.", Data Mining and Knowledge Discovery, 15 (2):181-215, 2007.

Robert Moskovitch and Yuval Shahar, "Medical temporal-knowledge discovery via temporal abstraction", AMIA Annu Symp Proc. 2009, 2009: 452-456, Nov. 2009.

Jyotishman Pathak, Abel N Kho, and Joshua C Denny, "Electronic health records-driven phenotyping: challenges, recent advances, and perspectives", Journal of the American Medical Informatics Association, 20 (e2):e206-e211, Dec. 2013.

Adam Perer and Fei Wang, "Frequence: interactive mining and visualization of temporal frequent event sequences", IUI, Feb. 2014.

Yuval Shahar and Mark A Musen, "Knowledge-based temporal abstraction in clinical domains", Artificial Intelligence in Medicine, 8(3) :267-298, 1996.

Stephan von Haehling, Wolfram Doehner, and Stefan D Anker, "Nutrition, metabolism, and the complex pathophysiology of cachexia in chronic heart failure", Cardiovascular Research, 73(2):298-309, 2007.

Jiayu Zhou, Fei Wang, Jianying Hu, and Jieping Yeo, From micro to macro: Data driven phenotyping by densification of longitudinal electronic medical records, In KDD 2014, Proceeding of the 20th ACM SIGKDD International Conference on Knowledge Discovery and Data Mining, 135-144.

* cited by examiner

LEARNING TEMPORAL PATTERNS FROM ELECTRONIC HEALTH RECORDS

BACKGROUND OF THE INVENTION

An electronic health record (EHR) is a digital version of a patient's paper chart that makes information instantly and securely available to the individuals who are authorized to access it (e.g., medical professionals across various health care organizations). For instance, a given patient's EHR may contain that patient's medical and treatment history, including diagnoses, medications prescribed, treatment plans, immunization dates, allergies, radiology images, laboratory and test results, and personal statistics (e.g., height, weight, vital signs).

SUMMARY OF THE INVENTION

In one embodiment, a computer-implemented method includes transforming a plurality of electronic health records into a plurality of temporal graphs indicating an order in which events observed in the plurality of electronic health records occur and learning a temporal pattern from the plurality of temporal graphs, wherein the temporal pattern indicates an order of events that is observed to occur repeatedly across the plurality of temporal graphs.

In another embodiment, a machine-readable storage medium encoded with instructions executable by a processor. The instructions cause the processor to perform operations including transforming a plurality of electronic health records into a plurality of temporal graphs indicating an order in which events observed in the plurality of electronic health records occur, and learning a temporal pattern from the plurality of temporal graphs, wherein the temporal pattern indicates a sequence of events that is observed to occur repeatedly across the plurality of temporal graphs.

In another embodiment, a system includes a processor for transforming a plurality of electronic health records into a plurality of temporal graphs indicating an order in which events observed in the plurality of electronic health records occur and a memory for storing a temporal pattern learned from the plurality of temporal graphs, wherein the temporal pattern indicates a sequence of events that is observed to occur repeatedly across the plurality of temporal graphs.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, a method, machine readable storage medium, and apparatus for learning temporal patterns from electronic health records (EHRs) is disclosed. Existing graph-based methods for performing electronic phenotyping (e.g., feature extraction) of EHRs are typically static. For instance, such methods form a vector as a group of features or events that occur together in an original EHR. However, such vectors overlook the temporality of the features or events, which, when taken together with the features or events, can suggest impending disease conditions that have not yet occurred or been diagnosed.

Within the context of the present invention, a "temporal phenotype" (also referred to as a "temporal pattern," a "temporal graph basis," or simply a "graph basis") is a data structure that is derived from one or more EHR-based temporal graphs and that captures evolving patterns of health conditions that may be hidden in the event sequences of the temporal graphs.

Embodiments of the present disclosure learn temporal patterns from EHRs in order to generate phenotypes that are time-dependent. In particular, embodiments of the present disclosure transform longitudinal EHRs into temporal graphs. Once the temporal graphs are constructed, temporal patterns can be learned. In this way, the resultant temporal phenotypes preserve event temporality, which can be useful in identifying impending disease conditions. For instance, if a patient is diagnosed with condition A, and one year later is diagnosed with condition B, the sequence and timing of these two diagnoses may indicate that the patient has a greater than average risk of developing condition C within two years. Knowing this risk before symptoms of condition C actually manifest may allow healthcare professionals to develop more effective treatments for treating and/or potentially preventing condition C in the patient.

Figure 1:
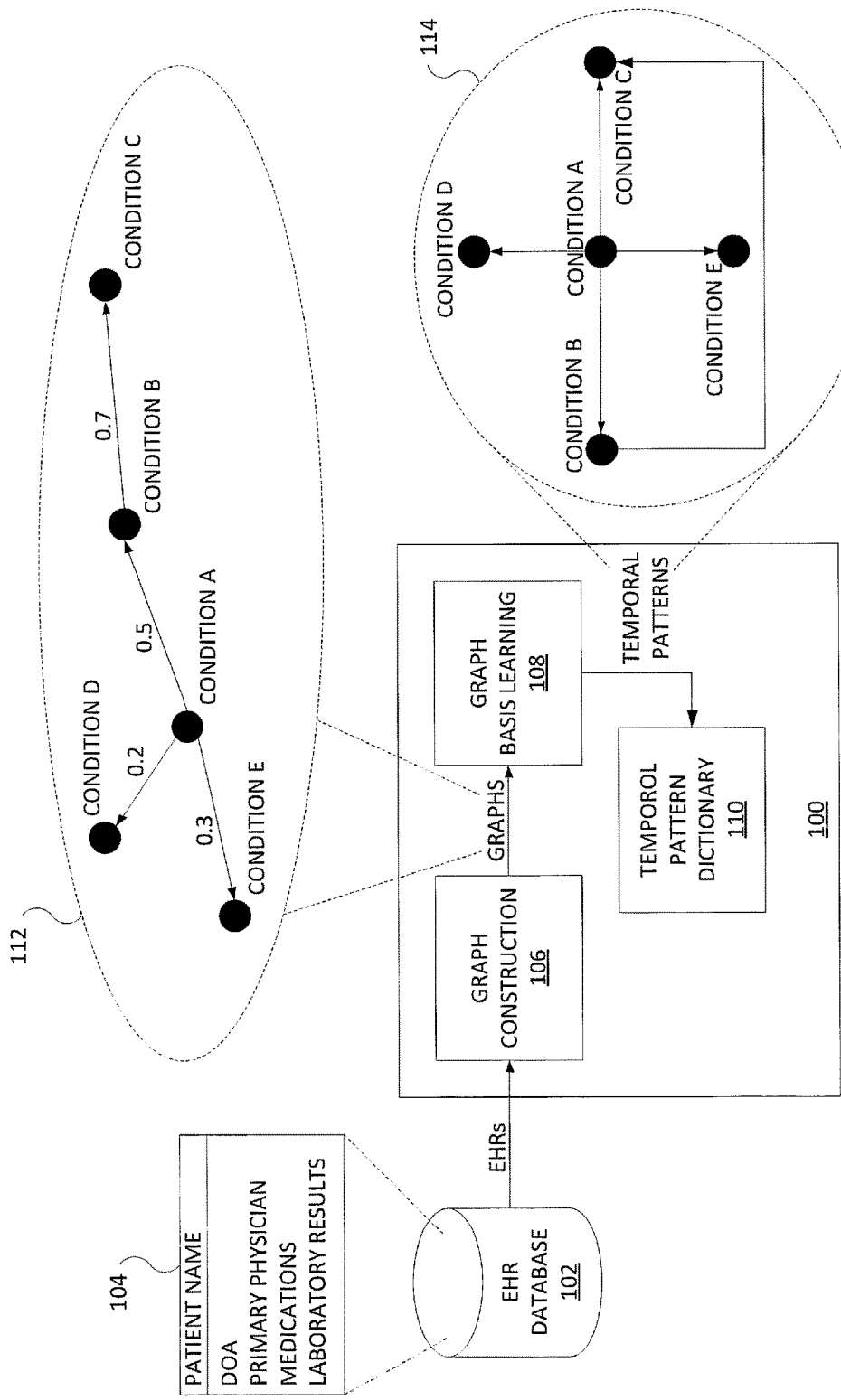
FIG. 1 is a block diagram illustrating one embodiment of a system for learning temporal patterns from electronic health records, according to the present disclosure.

FIG. 1 is a block diagram illustrating one embodiment of a system 100 for learning temporal patterns from electronic health records (EHRs), according to the present disclosure. As illustrated, the system 100 accesses a database 102 of EHRs, for example over a network connection. Each EHR stored in the EHR database 102, such as the EHR 104, may specify, for a given patient, some or all of the following types of data: the patient's medical and treatment history, including diagnoses, medications prescribed, treatment plans, immunization dates, allergies, radiology images, laboratory and test results, and personal statistics (e.g., height, weight, vital signs), the patient's personal or demographic data, including gender, date of birth, address, and occupation, and the identities of the patient's healthcare providers, including primary care physicians and specialists. An EHR may also include additional information not mentioned above. In one embodiment, the information is presented in the EHR in longitudinal form (e.g., with information listed in the order it is added to the EHR).

As further illustrated in FIG. 1, the system 100 generally comprises a graph construction engine 106, a graph basis learning engine 108, and a dictionary 110 of temporal patterns. Either or both of the graph construction engine 106 and the graph basis learning engine 108 may include a processor, as described in further detail in conjunction with FIG. 5. The dictionary 110 of temporal patterns may include a memory, as also described in further detail in conjunction with FIG. 5.

The graph construction engine 106 retrieves EHRs directly from the EHR database 102, e.g., via a network connection. The graph construction engine 106 transforms the EHRs into a plurality of temporal graphs, such as the example temporal graph 112. In one embodiment, each temporal graph comprises a plurality of nodes and a plurality of edges connecting the plurality of nodes. Each node of the temporal graph corresponds to an event (e.g., a diagnosis or result of a laboratory test) in the EHRs, while each edge of the temporal graph corresponds to a temporal ordering of the events corresponding to the nodes connected by the edge. For instance, each edge may include an arrowhead or other indicator, where the arrowhead points from the node corresponding to the earlier-occurring event to the node corresponding to the later-occurring event. In some cases, an edge may include arrowheads pointing in both directions. In addition, a weight may be assigned to one or more of the edges, where the weight corresponds to the time elapsed (e.g., average time) between the occurrences of the corresponding events. It should be noted that the example temporal graph 112 has been greatly simplified in order to more clearly illustrate aspects of the present disclosure; a temporal graph constructed from real EHRs may include a much larger number of nodes and edges.

The graph basis learning engine 108 retrieves the temporal graphs constructed by the graph construction engine 106, and, from the temporal graphs, learns a plurality of temporal patterns. For instance, the graph basis learning engine 108 may detect that certain patterns or sequences of events occur repeatedly across a plurality of temporal graphs. In one embodiment, graph basis learning engine 108 employs a graph-based learning technique to learn the temporal patterns. In one particular embodiment, the graph basis learning engine 108 employs an optimization procedure that minimizes both the graph reconstructor loss and the prediction loss.

Learned temporal patterns, such as temporal pattern 114, are stored in the dictionary 110 of temporal patterns. The dictionary 110 may be local to the system 100 or it may be remote, for example a remote database. Temporal patterns may be accessed from the dictionary 110 of temporal patterns in order to improve patient diagnoses, for example by predicting the onset of a particular condition based on a patient's medical history matching a stored temporal pattern to within some tolerance.

Figure 2:
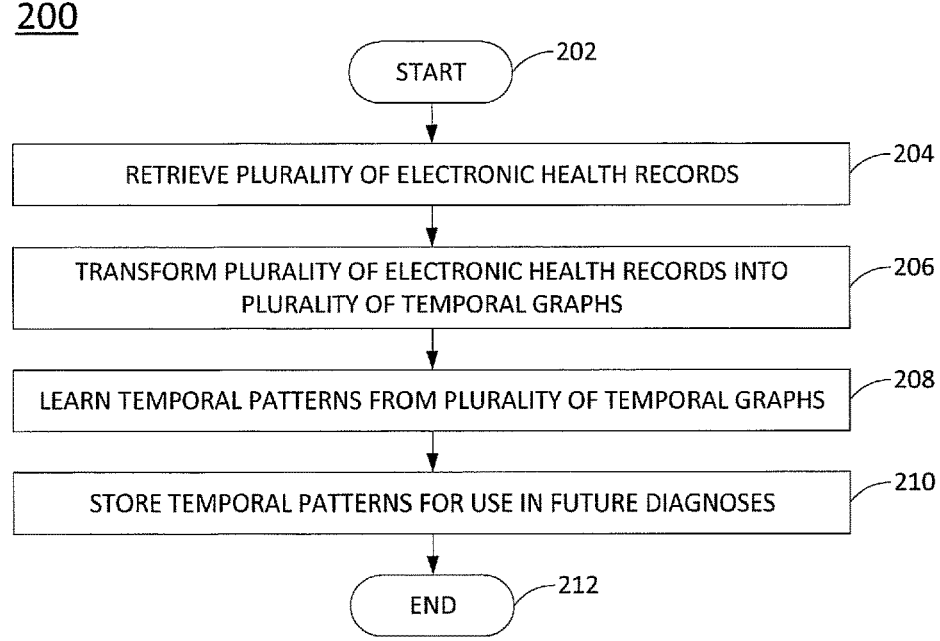
FIG. 2 is a flow diagram illustrating one example of a computer-implemented method for learning temporal patterns from electronic health records, according to the present disclosure.

FIG. 2 is a flow diagram illustrating one example of a computer-implemented method 200 for learning temporal patterns from electronic health records (EHRs), according to the present disclosure. The method 200 may be carried out, for example, by the system 100 of FIG. 1, or by a general purpose computer that is programmed to function as special purpose computer, as discussed below in connection with FIG. 5. As an example, the method 200 is described as being performed by the system 100.

The method 200 begins in step 202. In step 204, the graph construction engine 106 retrieves a plurality of EHRs. In one embodiment, the plurality of EHRs is retrieved from the EHR database 102, for example via a network connection. In one embodiment, each EHR in the plurality of EHRs may specify, for a given patient, some or all of the following types of data: the patient's medical and treatment history, including diagnoses, medications prescribed, treatment plans, immunization dates, allergies, radiology images, laboratory and test results, and personal statistics (e.g., height, weight, vital signs), the patient's personal or demographic data, including gender, date of birth, address, and occupation, and the identities of the patient's healthcare providers, including primary care physicians and specialists. An EHR may also include additional information not mentioned above. In one embodiment, the information is presented in the EHR in longitudinal form (e.g., with information listed in the order it is added to the EHR).

In step 206, the graph construction engine 106 transforms the plurality of EHRs into one or more temporal graphs. In one embodiment, each temporal graph comprises a plurality of nodes and a plurality of edges connecting the plurality of nodes. Each node of the temporal graph corresponds to an event (e.g., a diagnosis) in the EHRs, while each edge of the temporal graph corresponds to a temporal ordering of the events corresponding to the nodes connected by the edge. For instance, each edge may include an arrowhead or other indicator, where the arrowhead points from the node corresponding to the earlier-occurring event to the node corresponding to the later-occurring event. In addition, a weight may be assigned to one or more of the edges, where the weight corresponds to the time elapsed (e.g., average time) between the occurrences of the corresponding events.

In one embodiment, graph construction engine 106 computes the temporal graph $G^n$ of a sequence $s_n$ of events as a directed and weighted graph in which the event set is the node set $\{1, \ldots, M\}$ and there are N sequences $\{s_n: n=1, \ldots, N\}$. The sequence $s_n$ may be denoted by $s_n=((x_{nl}, t_{nl}): l=1, \ldots, L_n)$, where $L_n$ is the length of the sequence $s_n$. In other words, one can observe event $x_{nl}$ at time $t_{nl}$ in the sequence $s_n$. The events $x_{nl} \in \{1, \ldots, M\}$ and $t_{np} \leq t_{nq}$ for all $p<q$. Thus, $x_{np}$ and $x_{nq}$ are discrete events in the sequence $s_n$, and p and q indicate an ordering of the events $x_{np}$ and $x_{nq}$ (e.g., where $x_{np}$ happens before $x_{nq}$).

In this case, the weight $W_{ij}^n$ of the edge from node/event i to node/event j is computed as:

$$W_{ij}^n = \frac{1}{L_n} \sum_{1 \leq p \leq q \leq L_n} [x_{np} = i \wedge x_{nq} = j] \kappa_r(t_{nq} - t_{np}) \quad \text{(EQN. 1)}$$

Where $\kappa_r$ is a non-increasing function and r>0 is a scaling parameter that is related to the progression rate of the underlying sequences in the sequence $s_n$ of events. A larger r captures the similarities among events in a longer temporal range and potentially increases the connectivity of the temporal graph. Conversely, a smaller r only considers closely adjacent symbols as similar and causes the temporal graph to spread out more. In the extreme case where r approaches infinity, the weight $W^n$ becomes almost a constant matrix, since all of the events appearing in the sequence $s_n$ of events will be fully and equally connected.

The non-increasing function $\kappa_r$ can be computed as:

$$\kappa_r(\delta) = \begin{cases} \exp(-\delta/r) & \delta \leq \Delta \\ 0 & \delta > \Delta \end{cases} \quad \text{(EQN. 2)}$$

Thus, the more often event i and event j appear close to each other (e.g., within a threshold distance $\Delta$) in the sequence $s_n$ of events, the greater the weight $W_{ij}^n$ of the edge from node i to node j is. When the distance $\delta$ between event i and event j is smaller than the threshold distance $\Delta$, the non-increasing function $\kappa_r$ is computed using the non-increasing exponential function exp (−δ/r); otherwise, $\kappa_r=0$. In other words, a smaller edge weight is computed for an edge connecting events between which a larger time interval δ passed, when the time interval is smaller than or equal to the threshold Δ. When the time interval is greater than the threshold Δ, the event pair is ignored.

The scaling parameter r and threshold distance Δ are tunable and can be selected according to the particular application. For example, if there is little correlation between events occurring within a time interval larger than three months, then the threshold distance Δ can be set to three months. The scaling parameter r can also be empirically set to be the average time interval between consecutive events. The scaling parameter r can also be optimized based on the phenotyping performance in specific applications.

Figure 3:
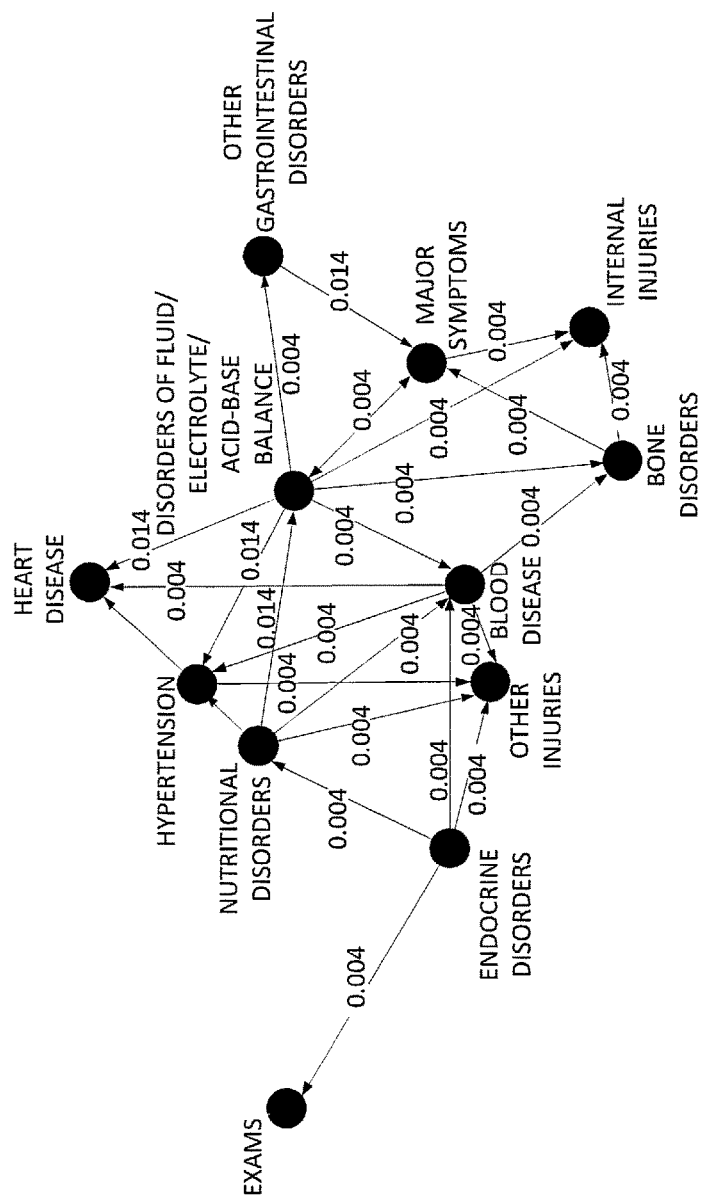
FIG. 3 illustrates a more detailed example temporal graph that can be constructed from a plurality of electronic health records.

FIG. 3 illustrates a more detailed example temporal graph 300 that can be constructed from a plurality of electronic health records (EHRs). As illustrated, each node of the graph 300 is labeled with a particular "event" related to patient health (e.g., in this case, a medical diagnosis, such as "heart disease," "endocrine disorders," "hypertension," etc.). Each edge includes at least one arrowhead indicating an order in which two connected diagnoses are observed to have occurred. Each edge is additionally labeled with a weight that is calculated in accordance with EQN. 1 and correlates to an amount of time (e.g., in days) elapsed between two connected diagnoses. In alternative embodiments, edge weights could be encoded by assigning different colors or different line weights to the edges.

Figure 4:
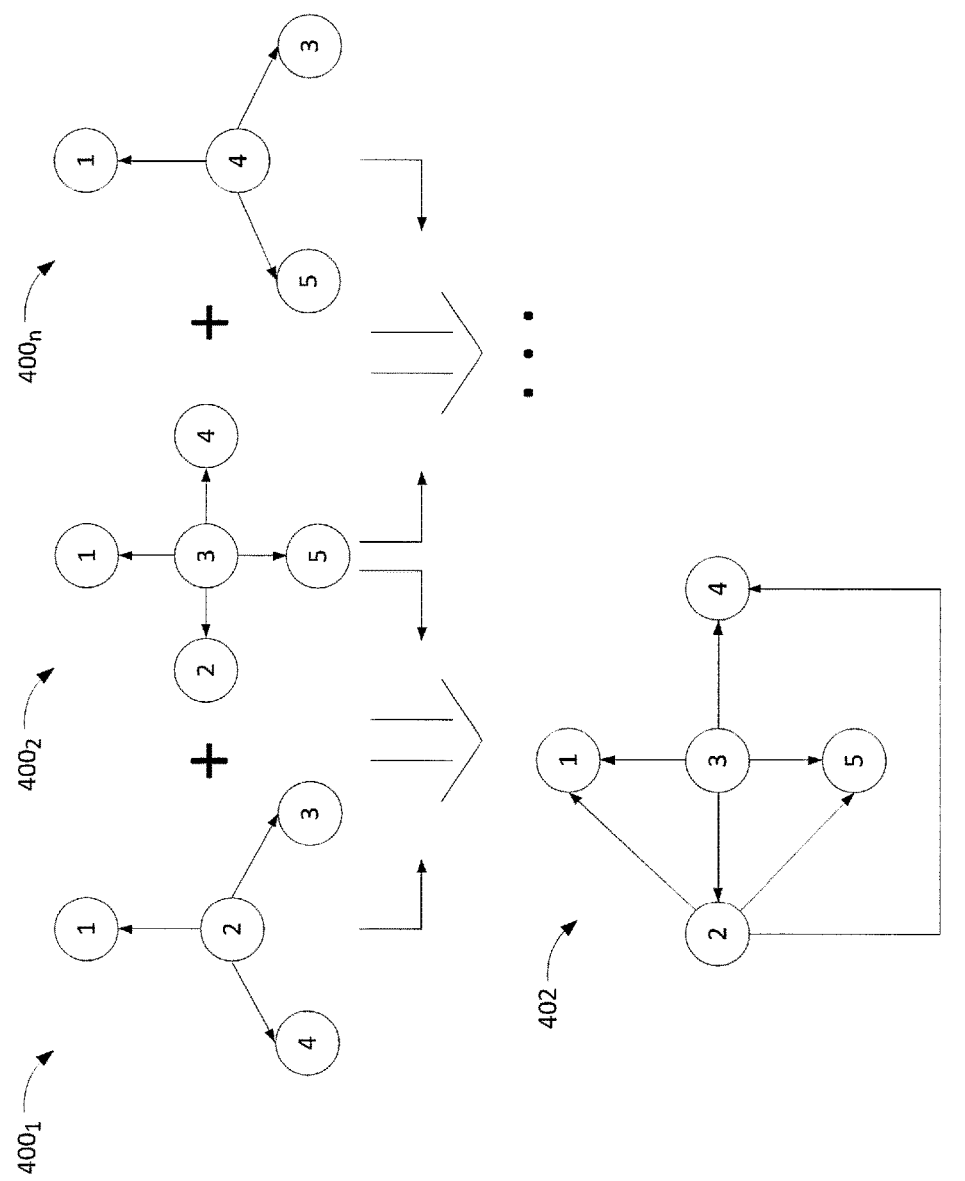
FIG. 4 illustrates a plurality of example temporal graph bases and an example temporal pattern that may be derived from the plurality of temporal graphs.

Referring back to FIG. 2, once the temporal graphs have been constructed, the method 200 proceeds to step 208. In step 208, the graph basis learning engine 108 learns one or more temporal patterns through analysis of the temporal graphs. A goal of the learning process is to identify the temporal patterns (or phenotypes or graph bases) that can be used to best explain the observations in the temporal graphs. In one embodiment, the graph basis is computed as the temporal phenotypes that can be used to reconstruct the observed temporal graphs. For instance, the graph basis learning engine 108 may detect that certain patterns or sequences of events occur repeatedly across a plurality of temporal graphs. FIG. 4, for example, illustrates a plurality of example temporal graph bases $400_1$-$400_n$ (hereinafter collectively referred to as "temporal graph bases 400") and an example temporal graph 402 that may be derived from the plurality of temporal graph bases 400. As illustrated, the temporal graph 402 incorporates sequences of events that are observed to be common to at least temporal graph bases $400_1$ and $400_2$ in the plurality of temporal graph bases 400; thus, the temporal graph 402 may be considered to be the average of the temporal graph bases $400_1$ and $400_2$. It should be noted that the temporal graph bases 400 and temporal graph 402 have been greatly simplified in order to more clearly illustrate aspects of the present disclosure. It should be further noted that the temporal graph basis may not be known in the beginning in practice. Embodiments of the present disclosure identify the unknown temporal graph bases based on the observed temporal graphs.

As discussed above, the resultant temporal graph bases capture evolving patterns of health conditions hidden in the event sequences of the temporal graphs. For instance, suppose the temporal graph $G^n$ is constructed for each sequence $s_n$, and that the graph $G^n$ is associated with the adjacency weight matrix $W^n \in \mathbb{R}^{M \times M}$. To reconstruct the graph $G^n$, it can be assumed that there are K graph bases $B^k \in \mathbb{R}^{M \times M}$ for k=1, 2, . . . , K, which can be used to approximate the adjacency matrix $W^n$ as follows:

$$W^n = \sum_{k=1}^{K} A_{nk} B^k \qquad \text{(EQN. 3)}$$

Where $A \in \mathbb{R}^{N \times K}$ is the matrix of reconstruction coefficients.

In one embodiment, the temporal patterns are learned in accordance with a graph-based learning technique. In one particular embodiment, the temporal patterns are learned in accordance with an optimization procedure that minimizes both the graph reconstructor loss and the prediction loss. For example, in one embodiment, the optimization procedure may be expressed as:

$$\mathcal{J}(A, B) = \frac{1}{2} \sum_{n=1}^{N} \left\| W^n - \sum_{k=1}^{K} A_{nk} B^k \right\|_F^2 \qquad \text{(EQN. 4)}$$

Where $\|\cdot\|_F$ is the matrix Frobenius norm.

In one embodiment, two constraints on the reconstruction coefficients in A and the graph basis $B^k$ for k=1, 2, . . . , K are considered. The first constraint imposes non-negativity, i.e., $B^k \geq 0$ for all k, since the original temporal graphs are non-negative. The second constraint requires $A \geq 0$ and $\sum_k A_{nk}=1$ for n=1, . . . , N, which forces the rows of A to be valid multinomial distributions. In this way, each patient can be quantified by the temporal graph bases with probabilities that can, in turn, be used for personalized medicine, patient segmentation, and disease diagnosis.

The reconstruction coefficients in A can be used in a variety of applications. For the particular application of medical diagnostics, a goal is to derive informative features to improve diagnosis performance, i.e., the classification of control/case groups of patients.

Thus, in one embodiment, the optimization procedure can be extended for temporal graphs with regularization $\Omega(A) \geq 0$ for incorporating additional knowledge of the patients in a study. In this embodiment, the optimization procedure of EQN. 4 can be rewritten as:

$$\mathcal{J}(A, B) = \frac{1}{2} \sum_{n=1}^{N} \left\| W^n - \sum_{k=1}^{K} A_{nk} B^k \right\|_F^2 + \lambda \Omega(A) \qquad \text{(EQN. 5)}$$

Where $\lambda \geq 0$ is a parameter controlling the degree of regularization. Regularization can be similarity-based or model-based, as discussed in greater detail below.

In similarity-based regularization, there is limited supervision, such as implicit similarity links between patients who are from the same group (e.g., case or control). The linked patients can be encouraged to have similar phenotyping representations in A using the following regularization:

$$\Omega(A) = \frac{1}{2} \sum_{n_1, n_2}^{N} \frac{1}{2} \| A_{n_1} - A_{n_2} \|^2 S_{n_1 n_2} \qquad \text{(EQN. 6)}$$

Where $S \in \mathbb{R}^{N \times N} > 0$ is a symmetric matrix encoding the similarity information. When S is asymmetric, S can be replaced with (S+S')/2 without changing the regularization function $\Omega(A)$. It follows that $S_{n_1 n_2} = S_{n_2 n_1}$ and:

$$\Omega(A) = \frac{1}{2} tr(A' L A) \qquad \text{(EQN. 7)}$$

Where L=D−S, and D is the diagonal degree matrix such that $D_{nn} = \Sigma_n S_{nn'}$. Some rows and columns of S may be completely zero if there is no knowledge of the corresponding patients (e.g., the instances in the test set).

In another embodiment, the group information (e.g., case or control) of the patients is accessible. In this case, the label $Y_n = 1$ if the $n^{th}$ patient is from the case group, and the label $Y_n = -1$ if the $n^{th}$ patient is from the control group. With the explicit label information, the regularization function $\Omega(A)$ can be defined directly with discriminative model $Pr(A_n, Y_n | \mathcal{H})$ as:

$$\Omega(A) = \frac{1}{|\mathcal{L}|} \sum_{n \in \mathcal{L}} \log Pr(A_n, Y_n | \mathcal{H}) \quad \text{(EQN. 8)}$$

Which is termed as average log-loss. In this case, $\mathcal{L}$ is the training patient set where one has the label $Y_n$ for $n \in \mathcal{L}$. $\mathcal{H}$ is the predictive modeling method, which can be, for example, a classification method or a regression method depending on the task.

One particular choice for the discriminative model used for case/control classification of patients is logistic regression and can be expressed as:

$$Pr(A_n, Y_n | \mathcal{H}) = \frac{1}{1 + \exp(-Y_n f(A_n))} \quad \text{(EQN. 9)}$$

Where the linear model $\mathcal{H}: A_n \mapsto f(A_n) = A_n \Theta + \theta$ and $(\Theta, \theta)$ are parameters in the linear model $\mathcal{H}$. It follows that:

$$\log Pr(A_n, Y_n | \mathcal{H}) = -\log(1 + \exp(-Y_n f(A_n))) \quad \text{(EQN. 10)}$$

In addition to the log-loss for the probabilistic model, other loss terms can also be used with the linear model $\mathcal{H}$. For example, the hinge loss for $(A_n, Y_n)$ can be considered according to the following:

$$\text{loss}(A_n, Y_n | \mathcal{H}) = \max\{0, 1 - Y_n f(A_n)\} \quad \text{(EQN. 11)}$$

And the general model-based regularization can be expressed as:

$$\Omega(A) = \frac{1}{|\mathcal{L}|} \sum_{n \in \mathcal{L}} \text{loss}(A_n, Y_n | \mathcal{H}) \quad \text{(EQN. 12)}$$

Referring back to FIG. 2, once the temporal patterns are learned, the temporal patterns can be stored in the dictionary 110 of temporal patterns in step 210. The method 200 then ends in step 212.

Thus, the system 100 and method 200 may operate in conjunction to learn temporal patterns from electronic health records. Learned temporal patterns may be accessed and analyzed in order to improve patient diagnoses, for example by predicting the onset of a particular condition based on a patient's medical history matching a stored temporal pattern to within some tolerance. As an example, the patient's medical history may indicate that the patient was diagnosed with condition A and subsequently diagnosed with condition C two years later. A stored temporal pattern may indicate that when condition A is followed by condition B within three years, there is an increased likelihood (e.g., x percent more likely) that the patient will develop condition C within five years.

For instance, experimental results have shown that a temporal pattern extracted in accordance with EQN. 5 can predict the onset of congestive heart failure with greater than 0.705 percent accuracy. Similarity-based regularization in accordance with EQN. 6 can predict the onset of congestive heart failure with greater than 0.675 percent accuracy, while prediction-based regularization in accordance with EQN. 7 can predict the onset of congestive heart failure with greater than 0.720 percent accuracy. Once the onset of a condition has been detected in a patient, the patient can be treated and/or monitored to prevent the condition worsening and/or fully developing.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Examples of the present disclosure may be a system, a computer-implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
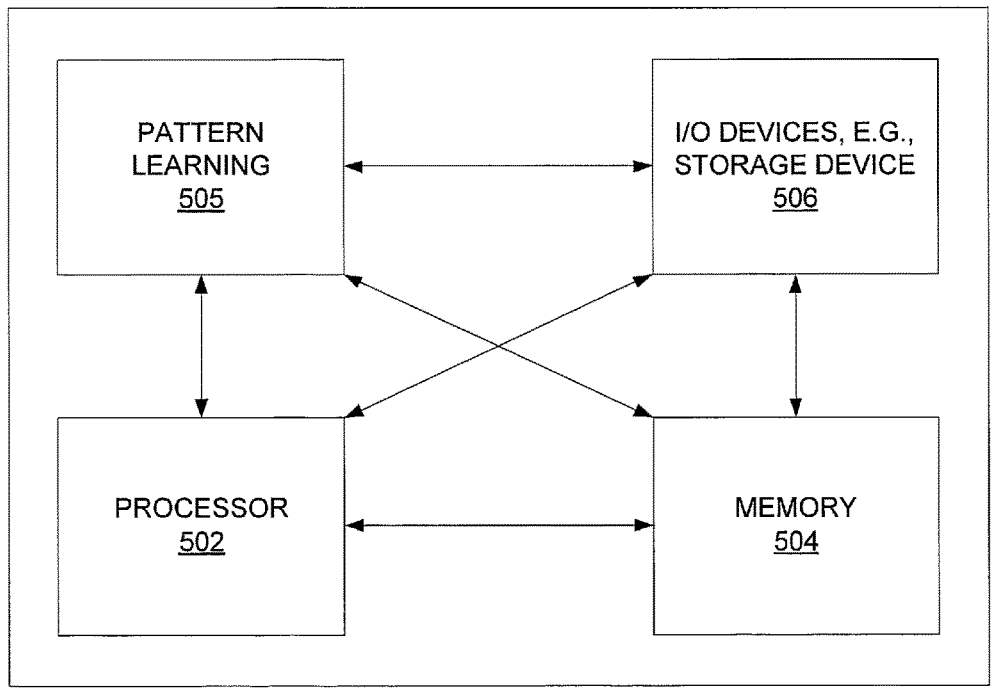
FIG. 5 depicts a high-level block diagram of a computer that can be transformed into a machine capable of performing the functions described herein.

FIG. 5, for example, depicts a high-level block diagram of a computer 500 that can be transformed into a machine capable of performing the functions described herein. The computer 500 may comprise, for example, part of the system 100 discussed above in connection with FIG. 1. Notably, no computer or machine currently exists that performs the functions as described herein. As a result, the examples of the present disclosure improve the operation and functioning of the general-purpose computer to learn temporal patterns from electronic health records, as disclosed herein.

As depicted in FIG. 5, the computer or system 500 comprises a hardware processor element 502 (e.g., a central processing unit (CPU), a microprocessor, or a multi-core processor), a memory 504, e.g., random access memory (RAM) and/or read only memory (ROM), a module 505 for learning temporal patterns from electronic health records, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed manner for a particular illustrative example, i.e., the steps of the above method(s) or the entire method(s) are implemented across multiple general-purpose computers, then the general-purpose computer of this figure is intended to represent each of those multiple general-purpose computers.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the respective systems and/or methods discussed above can be used to configure a hardware processor to perform the steps functions and/or operations of the above disclosed systems and methods. In one embodiment, instructions and data for the present module or process 505 for learning temporal patterns from electronic health records (e.g., a software program comprising computer-executable instructions) can be loaded into memory 504 and executed by hardware processor element 502 to implement the steps, functions or operations as discussed above in connection with the exemplary system 100 and/or method 200. The processor executing the computer readable or software instructions relating to the above described method(s) can be perceived as a programmed processor or a specialized processor. As such, the present module 505 for learning temporal patterns from electronic health records (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server. In addition, it should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
transforming, using a graph construction engine, a plurality of electronic health records into a plurality of temporal graphs indicating an order in which events observed in the plurality of electronic health records occur;
learning, using a graph basis learning engine, a temporal pattern from the plurality of temporal graphs, wherein the temporal pattern indicates a sequence of events that is observed to occur repeatedly across the plurality of temporal graphs, wherein the learning is performed in accordance with an optimization procedure, and wherein the optimization procedure is regularized based on labels that indicate whether individuals represented in the plurality of electronic health records are members of a case group or members of a control group;
matching a medical history of an individual to the temporal pattern, wherein at least some events in the sequence of events occur in the medical history in a same order and within a same time range as the at least some events occur in the temporal pattern; and
detecting an onset in the individual of a medical condition indicated by the temporal pattern before symptoms of the medical condition manifest in the individual.

2. The computer-implemented method of claim 1, wherein each graph in the plurality of temporal graphs comprises a plurality of nodes and a plurality of edges, wherein each node in the plurality of nodes corresponds to an event observed in the plurality of electronic health records, and wherein each edge indicates an order in which a pair of events in the electronic health records is observed to have occurred.

3. The computer-implemented method of claim 2, wherein each edge is labeled with a weight indicating an amount of time observed to have elapsed between the pair of events.

4. The computer-implemented method of claim 1, wherein the events comprise diagnoses of medical conditions.

5. The computer-implemented method of claim 1, wherein the events comprise results of laboratory tests.

6. The computer-implemented method of claim 1, wherein the learning is performed in accordance with a graph-based learning technique.

7. The computer-implemented method of claim 1, wherein the plurality of electronic health records are formatted in a longitudinal form.

8. A machine-readable storage medium encoded with instructions executable by a processor, wherein the instructions cause the processor to perform operations comprising:
transforming, using a graph construction engine, a plurality of electronic health records into a plurality of temporal graphs indicating an order in which events observed in the plurality of electronic health records occur;
learning, using a graph basis learning engine, a temporal pattern from the plurality of temporal graphs, wherein the temporal pattern indicates a sequence of events that is observed to occur repeatedly across the plurality of temporal graphs, wherein the learning is performed in accordance with an optimization procedure, and wherein the optimization procedure is regularized based on labels that indicate whether individuals represented in the plurality of electronic health records are members of a case group or members of a control group;
matching a medical history of an individual to the temporal pattern, wherein at least some events in the sequence of events occur in the medical history in a same order and within a same time range as the at least some events occur in the temporal pattern; and
detecting an onset in the individual of a medical condition indicated by the temporal pattern before symptoms of the medical condition manifest in the individual.

9. The machine-readable storage medium of claim 8, wherein each graph in the plurality of temporal graphs comprises a plurality of nodes and a plurality of edges, wherein each node in the plurality of nodes corresponds to an event observed in the plurality of electronic health records, and wherein each edge indicates an order in which a pair of events in the electronic health records is observed to have occurred.

10. The machine-readable storage medium of claim 9, wherein each edge is labeled with a weight indicating an amount of time observed to have elapsed between the pair of events.

11. The machine-readable storage medium of claim 8, wherein the learning is performed in accordance with a graph-based learning technique.

12. A system, comprising:
a processor for transforming, using a graph construction engine, a plurality of electronic health records into a plurality of temporal graphs indicating an order in which events observed in the plurality of electronic health records occur; and
a memory for storing a temporal pattern learned from the plurality of temporal graphs using a graph basis learning engine, wherein the temporal pattern indicates a sequence of events that is observed to occur repeatedly across the plurality of temporal graphs, wherein the temporal pattern is learned in accordance with an optimization procedure, and wherein the optimization procedure is regularized based on labels that indicate whether individuals represented in the plurality of electronic health records are members of a case group or members of a control group;

wherein the processor is further for:

matching a medical history of an individual to the temporal pattern, wherein at least some events in the sequence of events occur in the medical history in a same order and within a same time range as the at least some events occur in the temporal pattern; and detecting an onset in the individual of a medical condition indicated by the temporal pattern before symptoms of the medical condition manifest in the individual.

\* \* \* \* \*